(12) United States Patent
    Suzuki

(10) Patent No.: US 8,989,714 B2
(45) Date of Patent: Mar. 24, 2015

(54) INFORMATION PROCESSING APPARATUS, INFORMATION PROCESSING SYSTEM, NON-TRANSITORY COMPUTER READABLE MEDIUM THAT STORES A PROGRAM, AND INFORMATION PROCESSING METHOD

(71) Applicant: Fuji Xerox Co., Ltd., Tokyo (JP)

(72) Inventor: Yoshiharu Suzuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 207 days.

(21) Appl. No.: 13/626,436

(22) Filed: Sep. 25, 2012

(65) Prior Publication Data

US 2013/0254496 A1    Sep. 26, 2013

(30) Foreign Application Priority Data

Mar. 21, 2012    (JP) .................................. 2012-064445

(51) Int. Cl.
    *H04W 68/00* (2009.01)
    *G06F 17/30* (2006.01)
    *G06Q 10/00* (2012.01)

(52) U.S. Cl.
    CPC .......... *G06F 17/30241* (2013.01); *G06Q 10/00* (2013.01)
    USPC .................................... 455/414.1; 455/414.2

(58) Field of Classification Search
    USPC ........ 707/758; 340/995.1, 988, 990; 701/516; 455/414.1–2, 54.2, 561.1
    See application file for complete search history.

(56) References Cited

U.S. PATENT DOCUMENTS

| | | | | |
|---|---|---|---|---|
| 7,106,717 | B2 * | 9/2006 | Rousseau et al. | 370/338 |
| 8,027,691 | B2 * | 9/2011 | Bernas et al. | 455/456.3 |
| 8,234,311 | B2 | 7/2012 | Miyazaki | |
| 2004/0127229 | A1 * | 7/2004 | Ishii | 455/456.1 |
| 2006/0059152 | A1 | 3/2006 | Nakamura | |
| 2006/0142943 | A1 * | 6/2006 | Park | 701/213 |
| 2007/0287473 | A1 * | 12/2007 | Dupray | 455/456.1 |
| 2008/0183383 | A1 | 7/2008 | Asai et al. | |

(Continued)

FOREIGN PATENT DOCUMENTS

| | | | | |
|---|---|---|---|---|
| JP | 2002-369167 | * | 12/2002 | ............... H04N 7/15 |
| JP | A-2002-369167 | | 12/2002 | |

(Continued)

OTHER PUBLICATIONS

Office Action issued in Australian Patent Application No. 2012244087 dated Aug. 21, 2013.
Japanese Office Action issued in Japanese Patent Application No. 2012-064445 on Feb. 19, 2013 (with translation).

*Primary Examiner* — Hung T Vy
(74) *Attorney, Agent, or Firm* — Oliff PLC

(57) ABSTRACT

Disclosed is an information processing apparatus including a reception unit that receives place specifying information for specifying a place transmitted from a mobile terminal in the place where provision of management target information stored in a memory is requested, a controller that performs a control so that the place specifying information received by the reception unit is stored in the memory to be matched with the management target information, and a provision unit that provides, in a case where place specifying information corresponding to the place specifying information received by the reception unit is stored in the memory, the management target information matched with the corresponding place specifying information to the mobile terminal.

19 Claims, 13 Drawing Sheets

(56) References Cited

U.S. PATENT DOCUMENTS

| | | | |
|---|---|---|---|
| 2011/0053552 A1* | 3/2011 | Kim et al. | 455/404.2 |
| 2011/0161432 A1* | 6/2011 | Ellanti | 709/206 |
| 2011/0208750 A1 | 8/2011 | Miyazaki | |
| 2012/0098677 A1* | 4/2012 | Geelen | 340/932.2 |

FOREIGN PATENT DOCUMENTS

| | | |
|---|---|---|
| JP | A-2006-65511 | 3/2006 |
| JP | A-2011-175362 | 9/2011 |

* cited by examiner

FIG. 4

| DATE | TYPE | USER | POSITION | HANDLE |
|---|---|---|---|---|
| 2011/11/30 14:00:10 | BROWSING | A | XXX.YYY | Document-10 |
| 2011/11/30 14:05:10 | EDITING | B | ZZZ.XXX | Document-11 |
| 2011/11/30 14:10:10 | BROWSING | C | AAAA.BBB | Document-20 |
| 2011/11/30 14:15:10 | BROWSING | D | XXX.ZZZ | Document-10 |

| HANDLE | TITLE | STORAGE PASS |
|---|---|---|
| Document-10 | PT MATERIAL A | C:¥aaa¥PT MATERIAL A. txt |
| Document-11 | PT MATERIAL B | C:¥aaa¥PT MATERIAL B. txt |
| Document-20 | SUPPLEMENT A | C:¥aaa¥SUPPLEMENT A. txt |

46

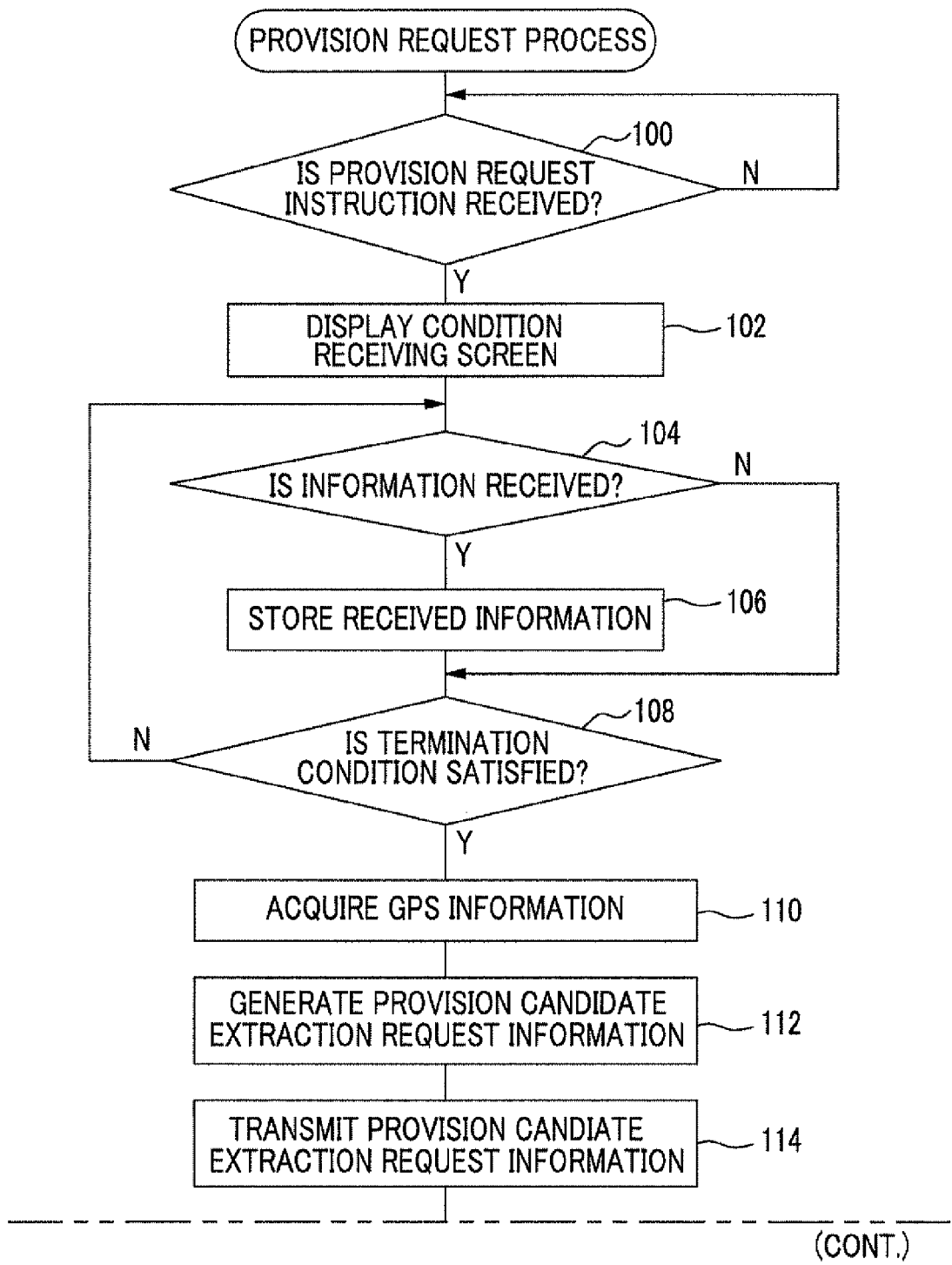

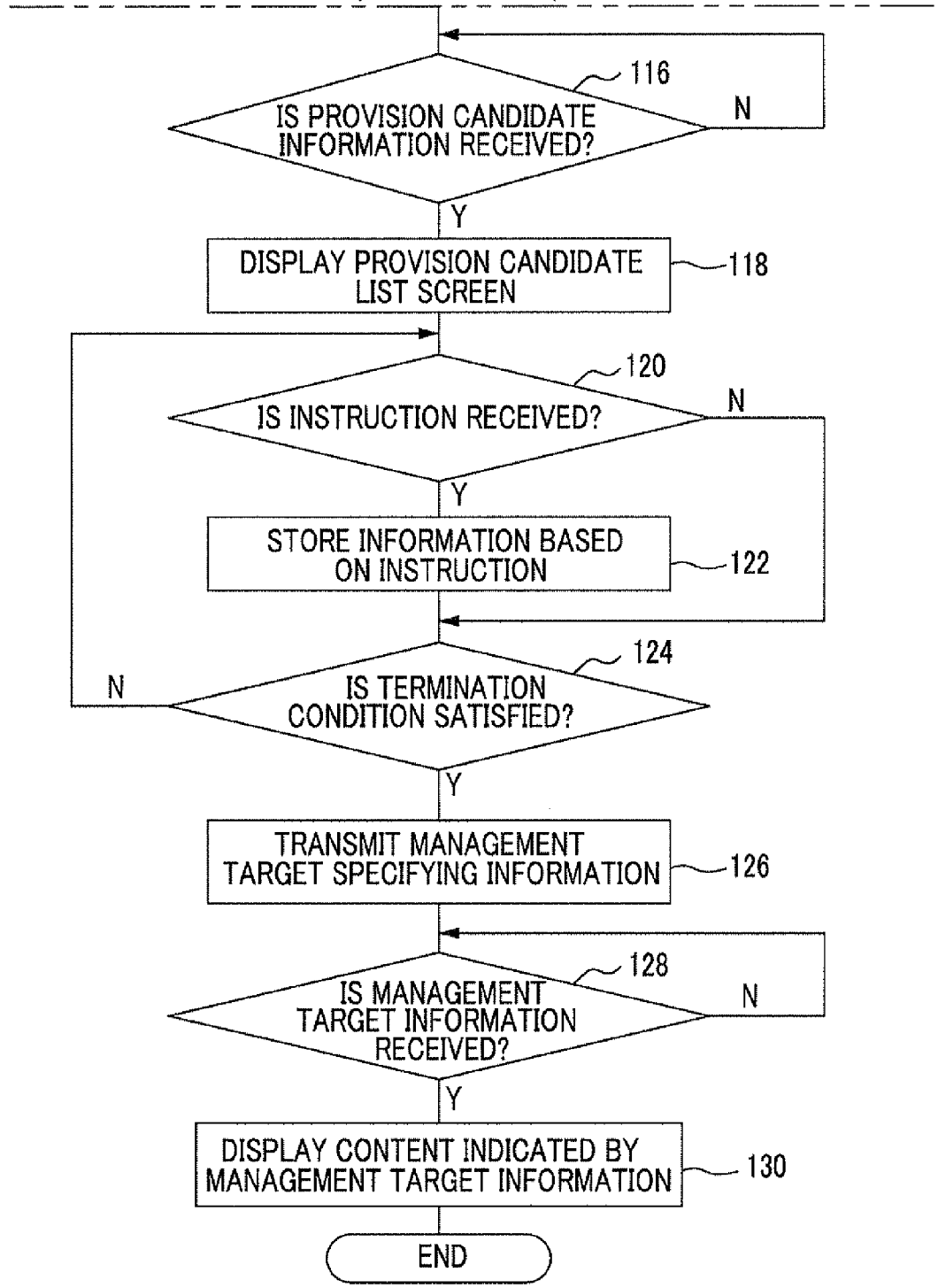

FIG. 8

| | PROVISION CANDIDATE LIST SCREEN | |
|---|---|---|
| NUMBER OF BROWSING TIMES | TITLE | |
| 50 | PT MATERIAL A | |
| 30 | SUPPLEMENT OF PT MATERIAL A | |
| 20 | SCHEDULE 1 | |
| 5 | SUPPLEMENT A | |
| 1 | MATERIAL α | |

86

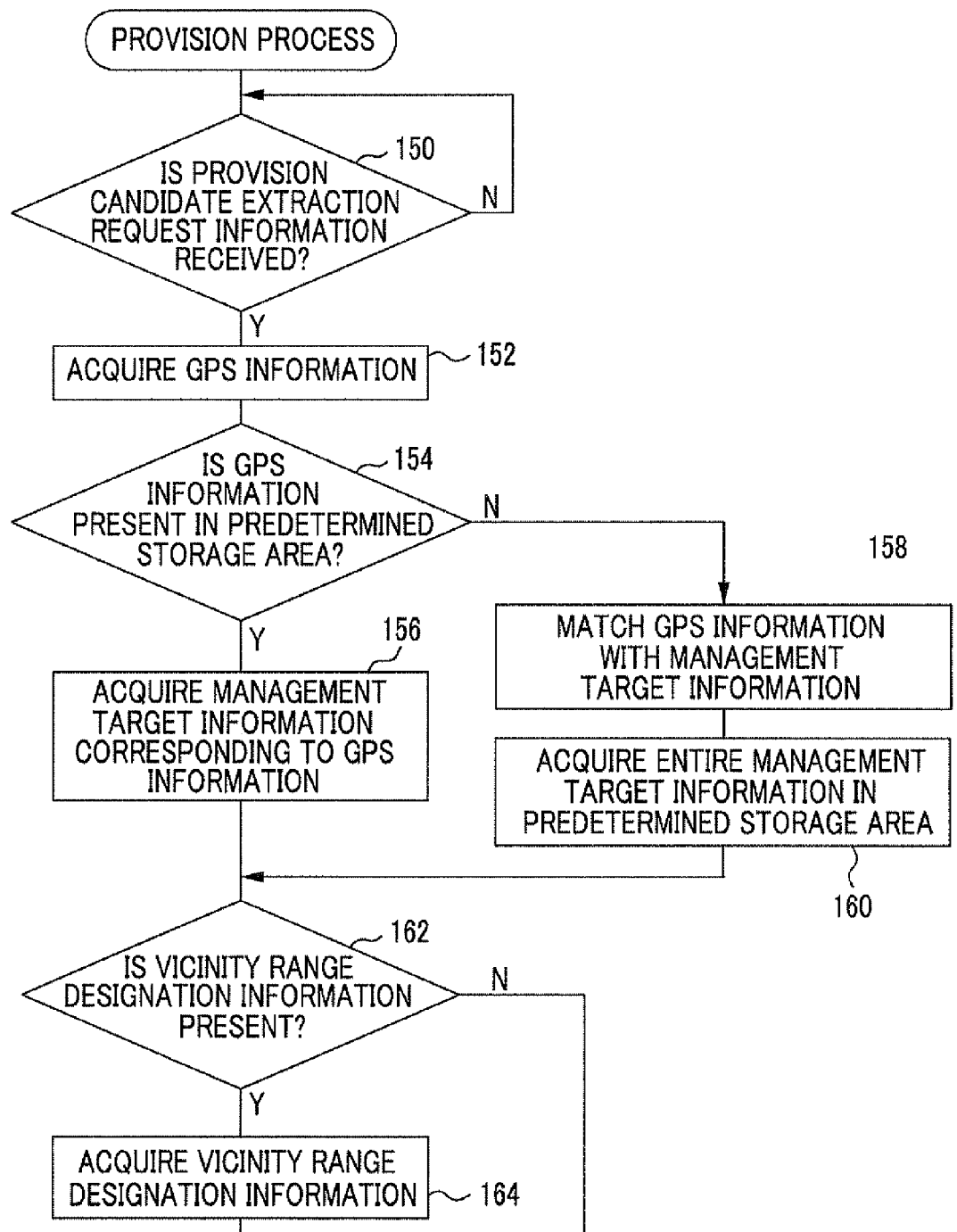

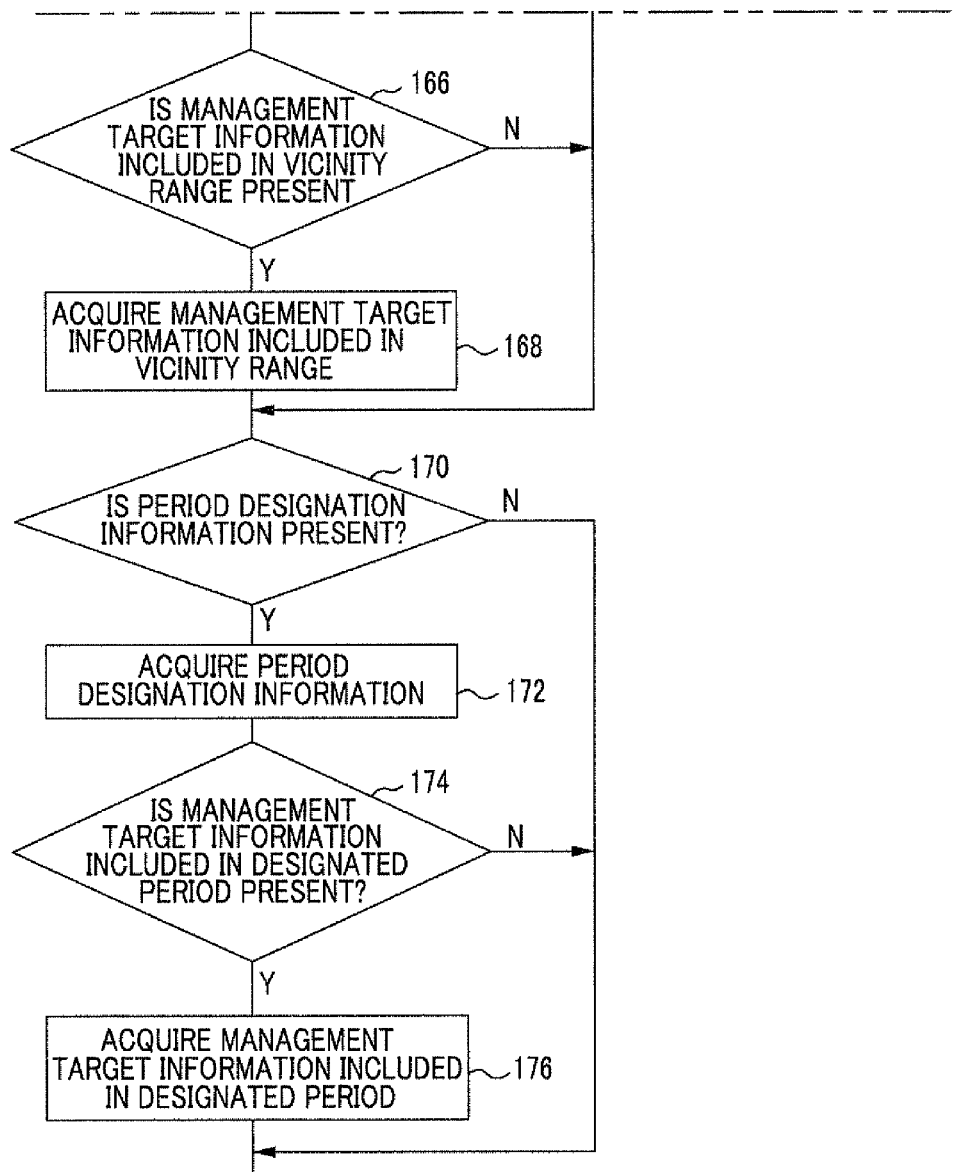

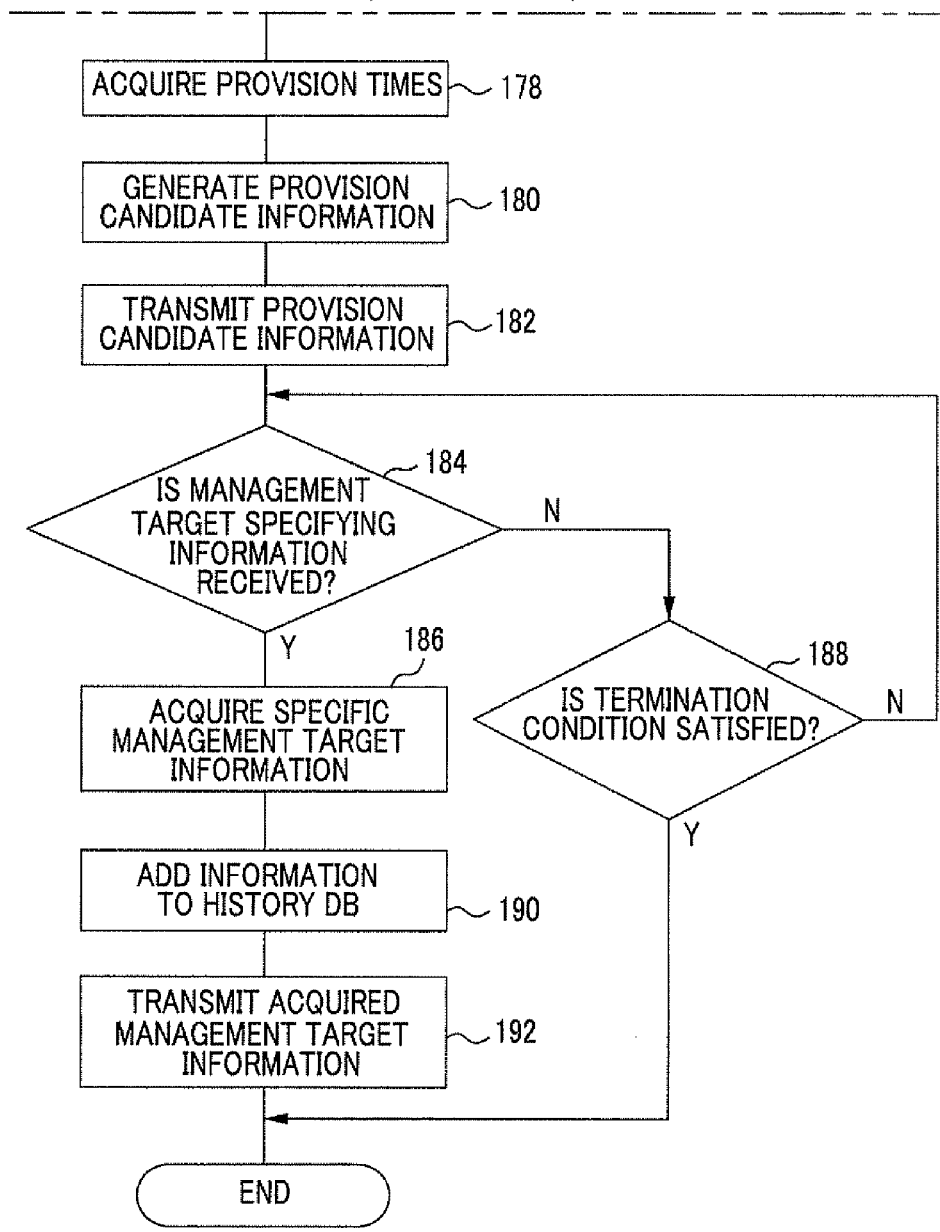

US 8,989,714 B2

INFORMATION PROCESSING APPARATUS, INFORMATION PROCESSING SYSTEM, NON-TRANSITORY COMPUTER READABLE MEDIUM THAT STORES A PROGRAM, AND INFORMATION PROCESSING METHOD

CROSS-REFERENCE TO RELATED APPLICATIONS

This application is based on and claims priority under 35 USC 119 from Japanese Patent Application No. 2012-064445 filed Mar. 21, 2012.

BACKGROUND

The present invention relates to an information processing apparatus, an information processing system, and a non-transitory computer readable medium that stores a program, and an information processing method.

SUMMARY

According to an aspect of the invention, there is provided an information processing apparatus including: a reception unit that receives place specifying information for specifying a place transmitted from a mobile terminal in the place where provision of management target information stored in a memory is requested; a controller that performs a control so that the place specifying information received by the reception unit is stored in the memory to be matched with the management target information; and a provision unit that provides, in a case where place specifying information corresponding to the place specifying information received by the reception unit is stored in the memory, the management target information matched with the corresponding place specifying information to the mobile terminal.

BRIEF DESCRIPTION OF THE DRAWINGS

Exemplary embodiments of the present invention will be described in detail based on the following figures, wherein:

FIG. 4 is a diagram schematically illustrating an example of a configuration of a history DB included in an information processing apparatus according to an exemplary embodiment;

FIG. 5 is a diagram schematically illustrating an example of a management target specifying DB included in an information processing apparatus according to an exemplary embodiment;

FIG. 6 is a flowchart illustrating an example of the flow of a provision request process performed in a mobile terminal according to an exemplary embodiment;

FIG. 8 is an appearance diagram illustrating an example of an aspect of a provision candidate list screen displayed on a display of a mobile terminal according to an exemplary embodiment;

FIG. 9 is a flowchart illustrating an example of the flow of a provision process performed in an information processing apparatus according to an exemplary embodiment.

DETAILED DESCRIPTION

Hereinafter, an example of an exemplary embodiment of a disclosed technique will be described in detail with reference to the accompanying drawings. In the following description, as an example of an information processing system, an information processing system that includes a tablet mobile terminal with a global positioning system (GPS) function and a server apparatus will be described. Here, as an example of the "server apparatus", a server apparatus that provides services according to a request from a mobile terminal is used. The mobile terminal is not limited to the tablet type, and for example, a multifunctional mobile phone (so-called smart phone), a mobile personal computer or the like may be used.

Figure 1:
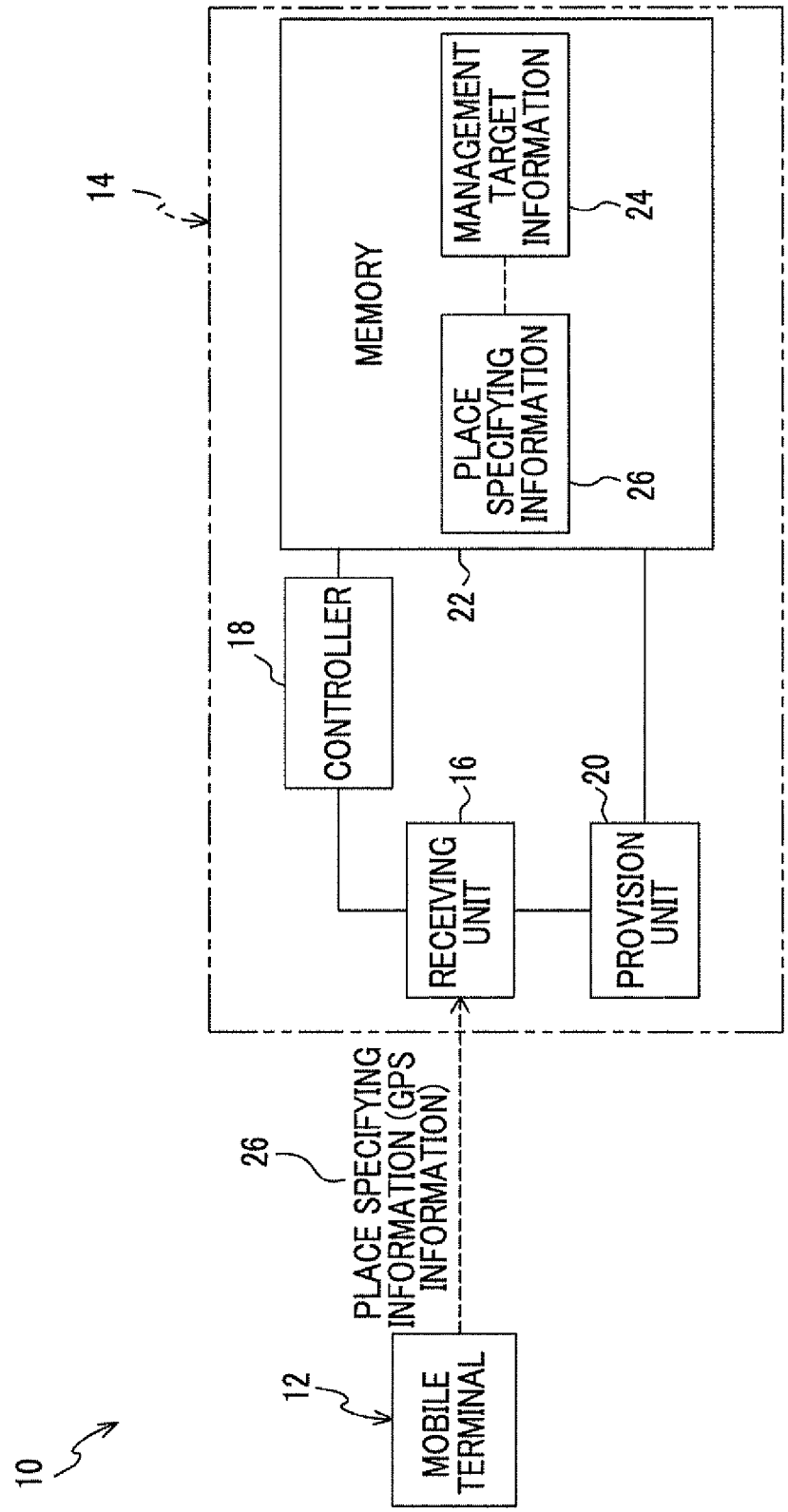
FIG. 1 is a functional block diagram illustrating an example of the main functions of an information processing system according to an exemplary embodiment.

FIG. 1 shows an example of the main functions of an information processing system 10 according to the present exemplary embodiment. The information processing system 10 includes a mobile terminal 12 and a server apparatus 14 that is an example of an information processing apparatus. The server apparatus 14 includes a receiving unit 16, a controller 18, and a provision unit 20 and a memory 22.

The mobile terminal 12 acquires place specifying information 26 for specifying a current place. GPS information is used as an example of the place specifying information. The mobile terminal 12 according to the present exemplary embodiment includes a GPS function, and activates the GPS function to acquire GPS information for specifying the current place. Here, the "GPS information" represents information indicating latitude, longitude, height and the like for specifying a current position calculated with errors of several centimeters to several tens of meters as radio waves are received from plural GPS satellites, for example. Further, in the information processing system 10 according to the present exemplary embodiment, the mobile terminal 12 and the server apparatus 14 perform information exchange through wireless communication, for example. Accordingly, the mobile terminal 12 transmits the place specifying information 26 indicating a place specified as a current place to the server apparatus 14. The place specifying information 26 transmitted from the mobile terminal 12 is received by the receiving unit 16 of the server apparatus 14.

Management target information 24 is stored in a memory 22 of the server apparatus 14, and provision of the management target information 24 is requested from the mobile terminal 12 to the server apparatus 14. Here, the "provision of the management target information 24 is requested from the mobile terminal 12" means that the receiving unit 16 of the server apparatus 14 receives the place specifying information 26 transmitted from the mobile terminal 12 at a place where the provision of the management target information 24 stored in the memory 22 is requested.

The controller 18 performs a control so that the place specifying information 26 received by the receiving unit 16 is matched with the management target information 24 to be stored in the memory 22. In a case where place specifying information 26 corresponding to the place specifying information 26 received by the receiving unit 16 is stored in the memory 22, the provision unit 20 provides the management target information 24 matched with the corresponding place specifying information 26. Here, the "place specifying information 26 corresponding to the place specifying information 26" means place specifying information 26 for specifying a place within a predetermined error (amount of deviation) with respect to the place specified by the place specifying information 26 received by the receiving unit 16, in addition to place specifying information 26 that is not different from the place specifying information 26 received by the receiving unit 16. The predetermined error may be set in the unit of several meters (for example, an error that occurs by the GPS to be used), for example. Further, the "provides the management target information 24" means that the management target information 24 is transmitted to the mobile terminal 12 by providing the management target information 24 to the mobile terminal 12 through wireless communication, for example.

Further, the provision unit 20 does not handle the management target information 24 having no record of provision during a predetermined period as a provision target. That is, in a state where the management target information 24 having a record of provision during the predetermined period is set as a provision target candidate, the management target information 24 matched with the place specifying information corresponding to the place specifying information 26 received by the receiving unit 16, among the candidates, is provided.

Further, the provision unit 20 does not handle the management target information 24 having no record of provision a predetermined number of times (for example, once) as a provision target. That is, in a state where the management target information 24 having a record of provision the predetermined number of times is set as a provision target candidate, the management target information 24 matched with the place specifying information 26 corresponding to the place specifying information 26 received by the receiving unit 16, among the candidates, is provided.

Further, in a case where the place specifying information corresponding to the place specifying information 26 received by the receiving unit 16 is stored in the memory 22, the provision unit 20 provides the management target information 24 that is matched with the corresponding place specifying information 26 and has the largest number of times of provision. Although described in detail later, in the present exemplary embodiment, for example, firstly, information (management target specifying information or title information) for specifying the management target information 24 having the largest number of times of provision is provided to a user. Further, a configuration is employed in which in a case where the user makes a request of provision of the management target information 24 having the largest number of times of provision, the management target information 24 is provided to the mobile terminal 12.

Further, in a case where the place specifying information 26 for specifying a vicinity place of the place specified by the place specifying information 26 received by the receiving unit 16 is stored in the memory 22, the provision unit 20 provides the management target information 24 matched with the place specifying information 26 for specifying the vicinity place. Here, the "vicinity place" represents a place that is not included in the determined error, and for example, a place within a range designated by the user. For example, in a case where a place that is within a radius of 10 m centering around the place specified by the received place specifying information is set as the predetermined error and a radius of 40 m from the center is designated by a user, a place included in a range from the radius of 10 m to the radius of 40 m is set to the "vicinity place".

Figure 2:
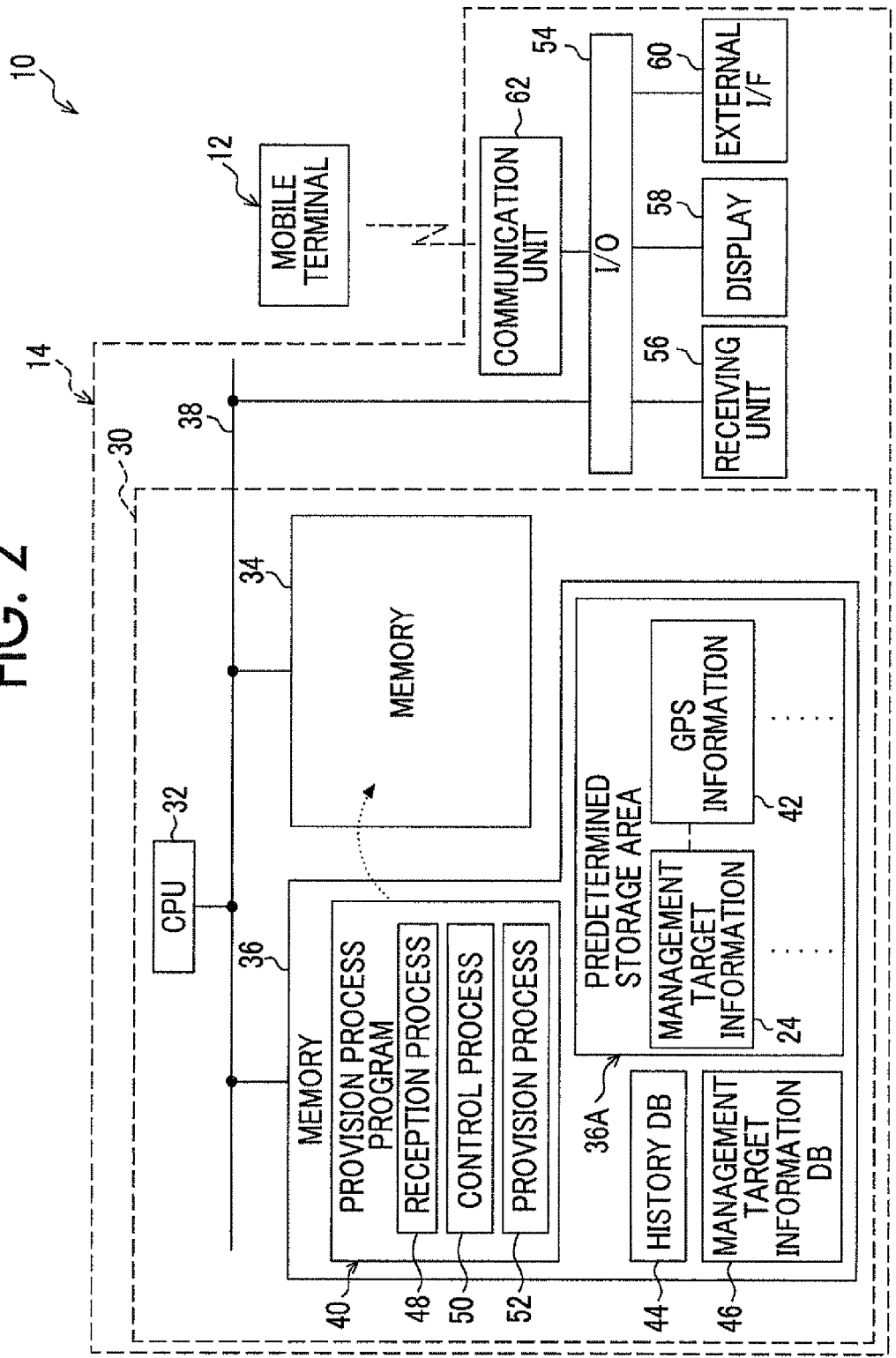
FIG. 2 is a block diagram illustrating an example of a configuration of an electric system of an information processing apparatus included in an information processing system according to an exemplary embodiment.

The receiving unit 16, the controller 18 and the provision unit 20 are realized by a computer 30, shown in FIG. 2, built in the server apparatus 14 and other input and output devices, for example. FIG. 2 shows an example of a configuration of the main parts of an electric system of the server apparatus 14. As shown in FIG. 2, the computer 30 includes a Central Processing Unit (CPU) 32, a memory 34 and a non-volatile memory 36, which are connected to each other through a bus 38 that includes an address bus, a system bus or the like. The memory 36 is realized by a Hard Disk Drive (HDD), a flash memory or the like. A provision process program 40, a history database (DB) 44 and a management target specifying DB 46 are stored in the memory 36 that is a storage medium. Further, the management target information 24 is stored in a predetermined storage area 36A in the memory 36, and GPS information 42 that is an example of the place specifying information 26 is stored to be matched therewith.

The CPU 32 reads the provision process program 40 from the memory 36 to develop the read provision process program 40 to the memory 34, and sequentially performs processes included in the provision process program 40. The provision process program 40 includes a reception process 48, a control process 50 and a provision process 52. The CPU 32 executes the reception process 48 to operate as the receiving unit 16 shown in FIG. 1. The CPU 32 executes the control process 50 to operate as the controller 18 shown in FIG. 1. Further, the CPU 32 executes the provision process 52 to operate as the provision unit 20 shown in FIG. 1.

In this way, in a case where the receiving unit 16, the controller 18, and the provision unit 20 are realized by the computer 30, the memory 36 that stores the management target information 24, the GPS information 42, the history DB 44 and the management target specifying DB 46 is used as the memory 22 shown in FIG. 1.

Here, an example in which the provision process program 40 is read from the memory 36 is shown, but it is not necessary to store the provision process program 40 in the memory 36 from the beginning. For example, each program may be firstly stored in an arbitrary "portable storage medium" such as a flexible disk, that is, a floppy disk, a CD-ROM, a DVD disk, a magneto-optical disk or an. IC card that is connected for use to the computer 30. Then, the computer 30 may acquire each program from the portable storage medium for execution. Further, each program may be stored in a different computer or server apparatus connected to the computer 30 through the internet, a Local Area Network (LAN) or the like, and the computer 30 may then acquire each program from the different computer or server apparatus for execution.

The server apparatus 14 includes an input and output interface (I/O) 54 that electrically connects the computer 30 to various input and output devices to perform transmission and reception of various information between the computer 30 and the various input and output devices. In the present exemplary embodiment, a receiving unit 56, a display 58, an external interface (I/F) 60 and a communication unit 62 are provided as input and output devices that are connected to the I/O 54 and are electrically connected to the computer 30 through the bus 38.

The receiving unit 56 receives an operation input from a user of the server apparatus 14. As the receiving unit 56, for example, an input device such as a key board, a mouse, a transmissive touch panel overlapped for use on a display, an operation button for power input, an operation button for setting various information and a scroll key is used.

The display 58 displays various information. A liquid crystal display is used as the display 58, for example. In the present exemplary embodiment, a touch panel display that is formed by overlapping a touch panel that is a part of the receiving unit 56 with a liquid crystal display that is the display 58 is used.

The external I/F 60 is connected to an external device such as a personal computer or a printer, and performs transmission and reception of various information between the external device and the computer 30. The communication unit 62 is connected to a communication network such as the Internet or LAN, for example, and performs transmission and reception of various information between the mobile terminal 12 connected to the communication network and the computer 30.

Figure 3:
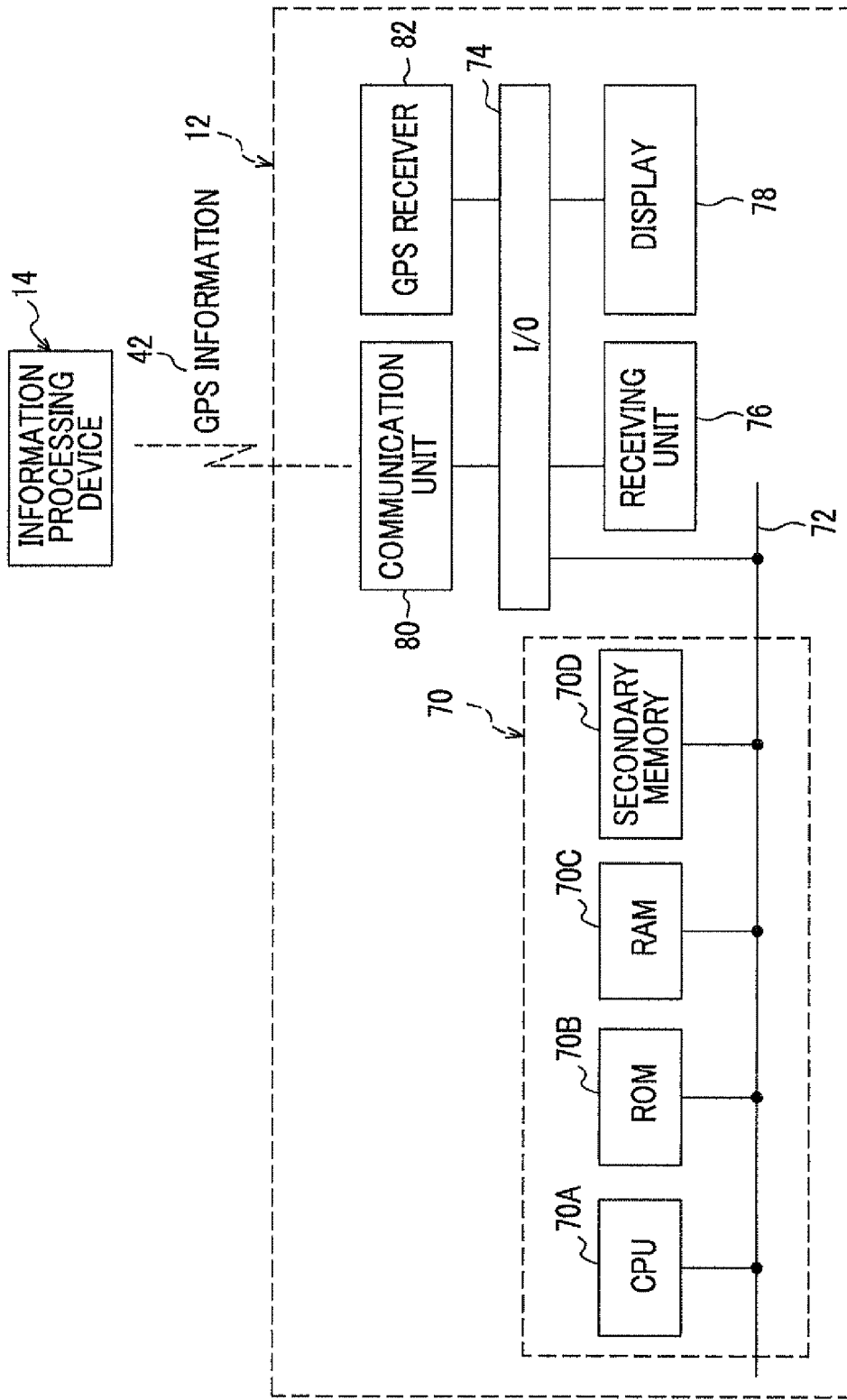
FIG. 3 is a block diagram illustrating an example of a configuration of an electric system of a mobile terminal included in an information processing system according to an exemplary embodiment.

FIG. 3 shows an example of a configuration of main parts of an electric system of the mobile terminal 12. As shown in FIG. 3, the mobile terminal 12 includes a computer 70. The computer 70 includes a CPU 70A, a Read Only Memory (ROM) 70B, a Random Access Memory (RAM) 70C and a secondary memory (for example, flash memory) 70D. The CPU 70A performs an overall operation of the mobile terminal 12. The ROM 70B functions as a memory that stores in advance a control program for controlling a basic operation of the mobile terminal 12, a provision request process program performed by the CPU 70A in order to realize a provision request process (which will be described later), various parameters and the like. The RAM 70C is used as a work area or the like when the various programs are executed. The secondary memory 70D functions as a non-volatile memory that stores various information that should be stored even though a power switch is turned off. The CPU 70A, the ROM 70B, the RAM 70C and the secondary memory 70D are connected to each other through a bus 72 that includes an address bus, a system bus and the like. Accordingly, information reading from the ROM 70B, the RAM 70C and the secondary memory 70D and information writing to the RAM 70C and the secondary memory 70D are performed, respectively by the CPU 70A.

The mobile terminal 12 includes an I/O 74 that electrically connects the computer 70 to various input and output devices and performs transmission and reception of various information between the computer 70 and the various input and output devices. In the present exemplary embodiment, a receiving unit 76, a display 78, a communication unit 80 and a GPS receiver 82 are provided as the input and output devices that are connected to the I/O 74 and are electrically connected to the computer 70 through the bus 72.

The receiving unit 76 receives an operation input from a user of the mobile terminal 12 or a dealer that performs maintenance and inspection of the mobile device 12, for example. For example, an input device such as a transmissive touch panel that is overlapped for use with a display, an operation button for power input, an operation button for setting various information or a scroll key is used as the receiving unit 76.

The display 78 displays various information. For example, a liquid crystal display is used as the display 78. In the present exemplary embodiment, a touch panel display that is formed by overlapping a touch panel that is a part of the receiving unit 76 with a liquid crystal display that is the display 78 is used.

The communication unit 80 is connected to a communication network such as the internet or LAN, for example, and performs transmission and reception of various information between the server apparatus 14 connected to the communication network and the computer 70. The GPS function is provided in the mobile terminal 12 according to the present exemplary embodiment. In the present exemplary embodiment, in order to realize the GPS function, the mobile terminal 12 includes the GPS receiver 82. The GPS receiver 82 receives radio waves from plural GPS satellites, and outputs reception result information indicating a reception result to the computer 70. Accordingly, the computer 70 executes a program that is determined in advance on the basis of the reception result information input from the GPS receiver 82 to calculate a current position of the mobile terminal 12 as GPS information 42. The calculated GPS information 42 is transmitted to the server apparatus 14 through the communication unit 80 by the mobile terminal 12 when provision of the management target information 24 is requested to the server apparatus 14. The server apparatus 14 receives the GPS information 42 transmitted from the mobile terminal 12, matches the received GPS information 42 with the management target information 24, or uses the result for extraction of the management target information 24.

FIG. 4 shows an example schematically illustrating a configuration of the history DB 44. Date and time information indicating the date and time when the management target information 24 is extracted from the memory 36 is stored in the history DB 44. Further, type information indicating the type of usage of the management target information 24 extracted from the memory 36 is stored in the history DB 44 at every date and time indicated by the date and time information. Further, user information for specifying a user (user who makes a request of provision of the management target information 24) who extracts the management target information 24 from the memory 36 is stored in the history DB 44 at every date and time indicated by the date and time information. Further, the GPS information 42 (indicated as "position" in FIG. 4) for specifying a position where the user specified by the corresponding user information makes the request of provision of the management target information 24 is stored in the history DB 44 at every date and time indicated by the date and time information. Further, management target specifying information (indicated by "handle" in FIG. 4) for uniquely specifying the management target information 24 extracted from the memory 36 by the user specified by the corresponding user information is stored in the history DB 44 at every date and time indicated by the date and time information.

FIG. 5 shows an example schematically illustrating a configuration of the management target specifying DB 46. Management target specifying information (indicated by "handle" in FIG. 5) is stored in the management target specifying DB 46. Further, title information indicating a title (for example, a file name) attached to the management target information 24 specified by the corresponding management target specifying information is stored in the management target specifying DB 46, every management target specifying information. Further, a storage path indicating an address of a storage location (for example, folder in which the management target information 24 is stored) of the management target information 24 specified by the corresponding management target specifying information is stored in the management target specifying DB 46, every management target specifying information.

Next, as an operation of the present exemplary embodiment, a provision request process that is performed by the mobile terminal 12 by executing the provision request process program by the CPU 70A will be described with reference to FIG. 6. In the provision request process shown in FIG. 6, firstly, in step 100, it is determined by the CPU 70A whether an instruction of requesting the server apparatus 14 to provide the management target information 24 stored in the memory 36 is received by the receiving unit 76. In the present step 100, in a case where the request instruction (provision request instruction) of provision of the management target information 24 to the server apparatus 14 is received by the receiving unit 76, the determination is affirmative and thus the procedure proceeds to step 102. In the present step 100, in a case where the provision request instruction is not received by the receiving unit 76, the determination is negative and thus the determination of the present step 100 is performed again.

Figure 7:
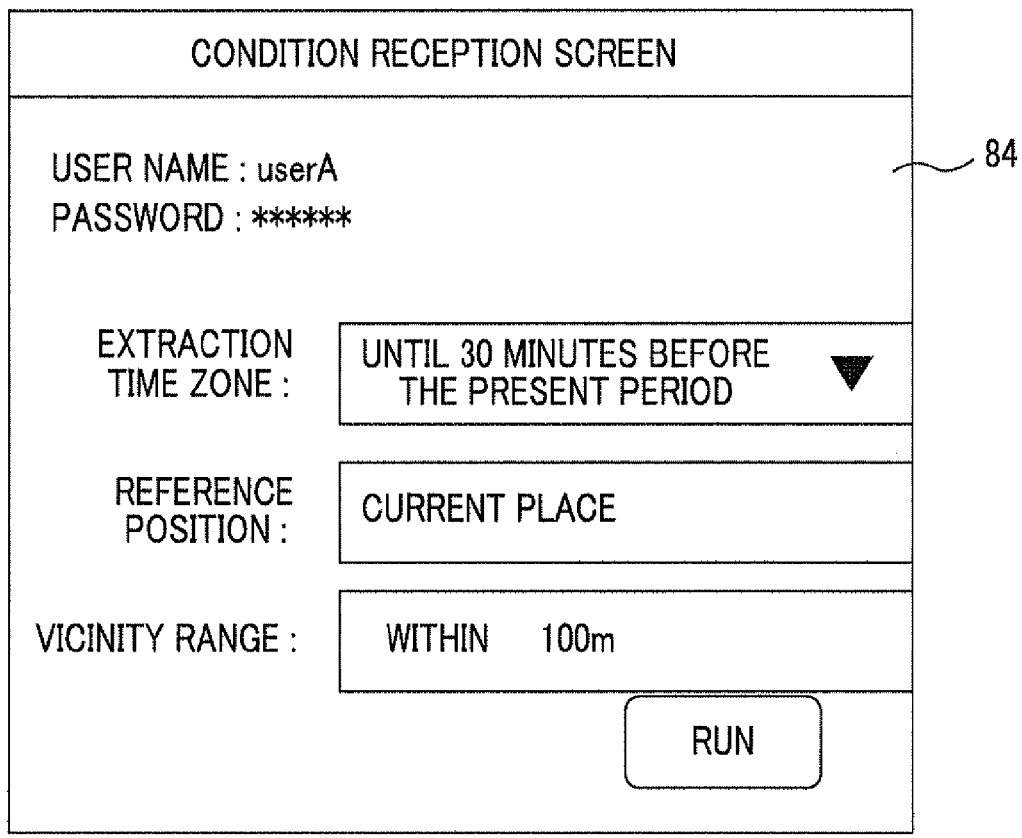
FIG. 7 is an appearance diagram illustrating an example of an aspect of a condition reception screen displayed on a display of a mobile terminal according to an exemplary embodiment.

In step 102, a condition reception screen 84 is displayed on the display 78 by the CPU 70A as shown in FIG. 7, as an example. The condition reception screen 84 is a screen on which a condition for specifying the management target information 24 of which the provision is requested to the server apparatus 14 is received. An item for inputting a user name and a password is provided on the condition reception screen 84. Further, an item of "extraction time zone" for designating a time zone when the management target information 24 stored in the memory 36 is extracted from the memory 36 is provided on the condition reception screen 84. That is, the item of "extraction time zone" uses the management target information 24 having a record of extraction during a predetermined period as a provision request target, and is thus an item for designating the predetermined period (previous period). FIG. 7 shows an example in which the management target information 24 extracted from the memory 36 during a period of 30 minutes before the present time is the management target information 24 that is the current provision request target. Here, a configuration in which one period is selected from a plural periods by a pull-down menu display is employed, but the exemplary embodiment is not limited thereto, and a configuration in which the period is received by the receiving unit 76 may be employed.

Further, an item of "reference position" for designating a reference position where the provision request for the management target information 24 stored in the memory 36 is previously performed is provided on the condition reception screen 84. In the example shown in FIG. 7, the management target information 24 of which the provision is previously requested at the place where the mobile terminal 12 is currently present and is then extracted from the memory 36 and becomes the current provision request target. That is, in the example shown in FIG. 7, the "current place" is designated in the item of "reference position". This means that the management target information 24 of which the provision is previously requested at the position where the mobile terminal 12 is currently present and is then extracted from the memory 36 becomes the current provision request target. However, the disclosed technique is not limited thereto. For example, if a "a place distant by 5 m to the northwest from the current place" is designated, the management target information 24 of which the provision is previously requested at the place distant by 5 m to the northwest from the place where the mobile terminal 12 is currently present and is then extracted from the memory 36 and becomes the current provision request target. In this way, the "reference position" may be a position determined with reference to the position where the mobile terminal 12 is currently present.

Further, an item of "vicinity range" for designating a vicinity range (peripheral area) of the reference position, which is an area where the provision request for the management target information 24 stored in the memory 36 is previously performed, is provided on the condition reception screen 84. In the example shown in FIG. 7, the management target information 24 of which the provision is previously performed at a place within a zone designated centering around the place where the mobile terminal 12 is currently present and is then extracted from the memory 36, with respect to the management target information 24 stored in the memory 36, is the management target information 24 that is the current provision request target. That is, in the example shown in FIG. 7, "within 100 m zone" is designated in the item of "vicinity range". This means that the management target information 24 of which the provision is previously requested at the place included within a radius of 100 m except the center centering around the position where the mobile terminal 12 is currently present and is then extracted from the memory 36 is the current provision request target.

In step 104, it is determined by the CPU 70A whether information relating to the item provided on the condition reception screen 84 is received by the receiving unit 76. In the present step 104, in a case where the information relating to the item provided on the condition reception screen 84 is received, the determination is affirmative and thus the procedure proceeds to step 106. In the present step 104, in a case where the information relating to the item provided on the condition reception screen 84 is not received, the determination is negative and thus the procedure proceeds to step 108.

In step 106, the information received in step 104 is displayed in the corresponding item of the condition reception screen 84 and is stored in the RAM 70C for each corresponding item of the condition reception screen 84 by the CPU 70A. In the next step 108, it is determined by the CPU 70A whether a condition (termination condition) for terminating the reception of the information relating to the item provided on the condition reception screen 84 is received is satisfied. Here, the "termination condition" may represent a termination instruction (for example, instruction of pushing a button of "run" on the condition reception screen) of the condition reception in the reception unit 76, for example. In the present step 108, in a case where the condition for terminating reception of the information relating to the item provided on the condition reception screen 84 is satisfied, the determination is affirmative and thus the procedure proceeds to step 110. In the present step 108, in a case where the condition for terminating reception of the information relating to the item provided on the condition reception screen 84 is not satisfied, the determination is negative and thus the procedure proceeds to step 104.

In step 110, the GPS information 42 for specifying the position where the mobile terminal 12 is currently present is acquired by the CPU 70A. In the next step 112, provision candidate extraction request information including the information (information relating to each item provided on the condition reception screen 84) stored in the RAM 70C in step 106 and the GPS information 42 acquired in step 110 is generated by the CPU 70. In the next step 114, the provision candidate extraction request information generated in step 112 is transmitted to the server apparatus 14 through the communication unit 80, by the CPU 70A.

In the next step 116, it is determined whether provision candidate information transmitted from the server apparatus 14 is received in the communication unit 80 by performing the provision process (which will be described later). In the present step 116, in a case where the provision candidate information is received in the communication unit 80, the determination is affirmative and thus the procedure proceeds to step 118. In the present step 116, in a case where the provision candidate information is not received in the communication unit 80, the determination is negative and thus the determination of step 116 is performed again.

In step 118, a provision candidate list screen 86 shown in FIG. 8 is displayed on a display 78 by the CPU 70A, as an example, on the basis of the provision candidate information received in step 116. Although described in detail later, the provision candidate information received in step 116 includes management target specifying information. Further, the provision candidate information includes corresponding title information for every management target specifying information. Further, the provision candidate information includes information indicating the previous provision number of times of the management target information 24 specified by the corresponding management target specifying information, every management target specifying information. Accordingly, a title attached to the management target information 24 stored in the memory 36 of the server apparatus 14 and a record (previous number of times of provision) that is previously provided to every management target information 24 is displayed on the provision candidate list screen 86. In an example shown in FIG. 8, "number of browsing times" is shown in a descending order as the previous provision record, and a title of the corresponding management target information 24 is shown every number of browsing times. In the example shown in FIG. 8, the management target information 24 to which the title of "PT material A" is attached is the most frequently browsed (provided) in the past.

In the next step 120, it is determined by the CPU 70A whether a provision request instruction of the management target information 24 specified by the title displayed on the provision candidate list screen 86 is received by the receiving unit 76. In the present step 120, in a case where the provision request instruction of the management target information 24 is received by the receiving unit 76, the determination is affirmative and thus the procedure proceeds to step 122. In the present step 120, in a case where the provision request instruction of the management target information 24 is not received by the receiving unit 76, the determination is negative and thus the procedure proceeds to step 124.

In step 122, information according to the instruction received in step 120 is stored in the RAM 70C by the CPU 70A. That is, the management target specifying information for specifying the management target information 24 of which the provision is requested according to the instruction received in step 120 is stored in the RAM 70C. Title information relating to the management target information 24 may be employed instead of the management target specifying information.

In the next step 124, it is determined by the CPU 70A whether a condition for terminating reception of the provision request instruction of the management target information 24 (condition for receiving a termination instruction of reception of the provision request instruction of the management target information 24 by the receiving unit 76, for example) is satisfied. In the present step 124, in a case where the condition for terminating reception of the provision request instruction of the management target information 24 is satisfied, the determination is affirmative and thus the procedure proceeds to step 126. In the present step 124, in a case where the condition for terminating reception of the provision request instruction of the management target information 24 is not satisfied, the determination is negative and thus the procedure proceeds to step 120.

In step 126, the information stored in the RAM 70C in step 122, that is, the management target specifying information is transmitted to the server apparatus 14 through the communication unit 80, by the CPU 70A. In the next step 128, it is determined by the CPU 70A whether the management target information 24 transmitted for provision from the server apparatus 14 by performing the provision process (which will be described later) is received in the communication unit 80. In the present step 128, in a case where the management target information 24 is received in the communication unit 80, the determination is affirmative and thus the procedure proceeds to step 130. In the present step 128, in a case where the management target information 24 is not received in the communication unit 80, the determination is negative and thus the determination of step 128 is performed again. Here, an example in which in a case where the determination is negative, the determination of step 128 being performed again is shown, but the present exemplary embodiment is not limited thereto. That is, in a case where a predetermined time (for example, 60 seconds) elapses after step 126 is performed, the provision request process may end.

In step 130, as the content indicated by the management target information 24 received in step 128 is displayed on the display 78 by the CPU 70A, the management target information 24 is provided to the user, and then, the present provision request process ends.

Next, as an operation of the present exemplary embodiment, the provision process that is performed by the server apparatus 14 by executing the provision process program by the CPU 32 will be described with reference to FIG. 9. In the provision process shown in FIG. 9, firstly, in step 150, it is determined whether the provision candidate extraction request information transmitted from the mobile terminal 12 in step 114 of the provision request process is received by the receiving unit 16. In the present step 150, in a case where the provision candidate extraction request information is received, the determination is affirmative and thus the procedure proceeds to step 152. In the present step 150, in a case where the provision candidate extraction request information is not received, the determination is negative and thus the determination of the present step 150 is performed again.

In step 152, the GPS information 42 is acquired from the provision candidate extraction request information received in step 150 by the controller 18 and the provision unit 20. In the next step 154, it is determined by the controller 18 whether the GPS information 42 acquired in step 152 is stored in the memory 36. In the present step 154, in a case where the GPS information 42 is stored in the memory 36, the determination is affirmative and thus the procedure proceeds to step 156. In the present step 154, in a case where the GPS information 42 is not stored in the memory 36, the determination is negative and thus the procedure proceeds to step 158.

In step 158, the GPS information 42 acquired in step 152 is matched with the management target information 24 stored in the memory 36 and stored in the memory 36. In the next step 160, the overall management target information 24 stored in the memory 36 is acquired by the provision unit 20.

On the other hand, in step 156, the management target information 24 matched with the GPS information 42 acquired in step 152 is acquired from the management target information 24 stored in the memory 36 by the provision unit 20.

In the next step 162, it is determined by the provision unit 20 whether the provision candidate extraction request information received in step 150 includes vicinity range designation information for designating the vicinity range. In the present step 162, in a case where the provision candidate extraction request information includes the vicinity range designation information, the determination is affirmative and thus the procedure proceeds to step 164. In the present step 162, in a case where the provision candidate extraction request information does not include the vicinity range designation information, the determination is negative and thus the procedure proceeds to step 170.

In step 164, the vicinity range designation information is acquired from the provision candidate extraction request information received in step 150 by the provision unit 20. In the next step 166, it is determined by the provision unit 20 whether the management target information 24 matched with the GPS information 42 for specifying a position in the vicinity range designated by the vicinity range designation information acquired in step 164 is present in the management target information 24 that is currently acquired. In the present step 166, in a case where the management target information 24 matched with the GPS information 42 for specifying the position in the designated vicinity range is present in the management target information 24 that is currently acquired, the determination is affirmative and thus the procedure proceeds to step 168. In the present step 166, in a case where the management target information 24 matched with the GPS information 42 for specifying the position in the designated vicinity range is not present in the management target information 24 that is currently acquired, the determination is negative and thus the procedure proceeds to step 170. In step 168, the management target information 24 matched with the GPS information 42 for specifying the position in the designated vicinity range is acquired from the management target information 24 that is currently acquired, by the provision unit 20. That is, management target information 24 other than the management target information 24 matched with the GPS information 42 for specifying the position in the designated vicinity range is discarded from the management target information 24 that is currently acquired.

In the next step 170, it is determined by the provision unit 20 whether the provision candidate extraction request information received in step 150 includes period designation information for designating "extraction time zone". In the present step 170, in a case where the provision candidate extraction request information includes the period designation information, the determination is affirmative and thus the procedure proceeds to step 172. In the present step 170, in a case where the provision candidate extraction request information does not include the period designation information, the determination is negative and thus the procedure proceeds to step 178.

In step 172, period designation information is acquired from the provision candidate extraction request information received in step 150 by the provision unit 20. In the next step 174, it is determined by the provision unit 20 whether the management target information 24 having a record of extraction from the memory 36 at the "extraction time zone" designated by the period designation information acquired in step 172 is present in the management target information 24 that is currently acquired, on the basis of the history DB 44. In the present step 174, in a case where the management target information 24 having the record of extraction from the memory 36 at the designated "extraction time zone" is present in the management target information 24 that is currently acquired, the determination is affirmative and thus the procedure proceeds to step 176. In the present step 174, in a case where the management target information 24 having the record of extraction from the memory 36 at the designated "extraction time zone" is not present in the management target information 24 that is currently acquired, the determination is negative and thus the procedure proceeds to step 178. In step 176, the management target information 24 having the record of extraction from the memory 36 at the designated "extraction time zone" is acquired from management target information 24 that is currently acquired by the provision unit 20. That is, management target information 24 other than the management target information 24 having the record of extraction from the memory 36 at the designated "extraction time zone" is discarded from management target information 24 that is currently acquired.

In step 178, the respective previous provision number of times is acquired by the provision unit 20, with respect to the management target information 24 that is currently acquired, on the basis of the history DB 44. In the next step 180, provision candidate information that includes the management target specifying information relating to the management target information 24 that is currently acquired, the title information, and the previous provision number of times acquired in step 178, that corresponds to each management target information 24 that is currently acquired, are generated by the provision unit 20. Here, the management target specifying information and the title information included in provision candidate information are acquired from the history DB 44 and the management target specifying DB 46.

In the next step 182, the provision candidate information generated in step 180 is transmitted to the mobile terminal 12 through the communication unit 62. The provision candidate information transmitted to the mobile terminal 12 includes the management target specifying information for specifying the management target information 24, the title information and the previous provision number of times acquired in step 178 matched to each acquired management target information 24, acquired by the provision unit 20 when the provision process of step 180 is performed. Accordingly, in step 118 of the provision request process, the number of times of provision is displayed as the number of browsing times for each management target information 24, and the title of the management target information 24 is displayed corresponding to the number of browsing times.

In the next step 184, it is determined whether the management target specifying information transmitted from the mobile terminal 12 in step 126 of the provision request process is received by the receiving unit 16. In the present step 184, in a case where the management target specifying information is received, the determination is affirmative and thus the procedure proceeds to step 186. In the present step 184, in a case where the management target specifying information is not received, the determination is negative and thus the procedure proceeds to step 188. In step 188, it is determined whether a condition for terminating the present provision process (for example, a condition that a predetermined period (for example, 60 seconds) elapses after step 182 is performed) is satisfied. In the present step 188, in a case where the condition for terminating the present provision process is satisfied, the determination is affirmative and thus the present provision process ends. In the present step 188, in a case where the condition for terminating the present provision process is not satisfied, the determination is negative and thus the procedure proceeds to step 184.

In step 186, the management target information 24 specified by the management target specifying information received in step 184 is acquired from the memory 36. In the next step 190, information relating to the management target information 24 acquired in step 186 is added to the history DB 44. That is, date and time information, type information, user information, GPS information and management target specifying information relating to the management target information 24 acquired in step 186 are added to the history DB 44.

In the next step 192, the management target information 24 acquired in step 186 is transmitted to the mobile terminal 12 through the communication unit 62, and then the present provision process ends. If the information is transmitted to the mobile terminal 12 in this way, in step 128 of the provision request process, the management target information 24 is received by the CPU 70A, and in step 130, the content indicated by the management target information 24 received in step 128 is displayed on the display 78 by the CPU 70A.

Accordingly, if there is a record that provision of the management target information 24 is previously requested at the place where the mobile terminal 12 is currently present and the management target information 24 is provided from the server apparatus 14 according to the request, management target information 24 that is not different from the management target information 24 that is previously provided is provided.

Figure 10:
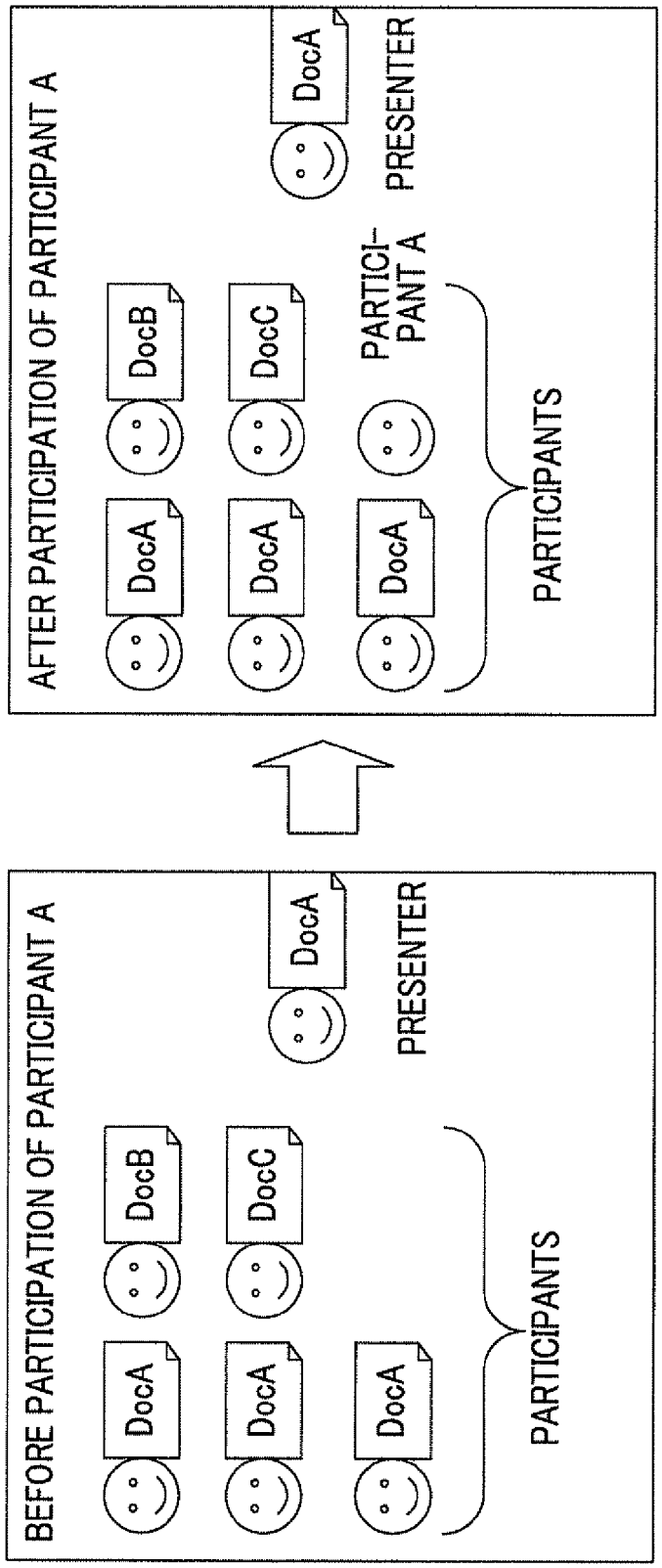
FIG. 10 is a diagram schematically illustrating an example of a provision state of a material provided to a presenter and a participant in a presentation that uses an information processing system according to an exemplary embodiment.

FIG. 10 schematically shows an example of a material possessed by a presenter in a certain presentation and a material possessed by a participant (audience). In a case where a presenter makes a presentation using document materials of "Doc A to Doc C" that are an example of the content indicated by the management target information 24 in a certain presentation as shown in FIG. 10, it is assumed that only the presenter comes to the place of the presentation without document materials. In this case, the presenter makes a request of provision of the management target information 24 indicating the document materials to the server apparatus 14 through the mobile terminal 12 possessed by the presenter (steps 100 to 114). Here, while the management target information 24 indicating the document materials is stored in the memory 36, since there is no record of provision of the management target information 24, the GPS information 42 is not matched with the management target information 24 (step 154: N). Thus, the GPS information 42 for specifying the current place of the mobile terminal 12 that is possessed by the presenter is matched with the management target information 24 indicating the document materials by the server apparatus (step 160). Further, the server apparatus 14 transmits information (for example, management target specifying information, title information and provision number of times) relating to the management target information 24 stored in the memory 36 to the mobile terminal 12 as provision candidate information (step 182).

With reference to the information relating to the management target information 24 transmitted from the server apparatus 14 through the mobile terminal 12, the presenter makes a request of provision of desired management target information 24 to the server apparatus 14 (step 126). The server apparatus 14 acquires the desired management target information 24 from the memory 36 according to the request, and transmits the acquired management target information 24 to the mobile terminal 12 of the presenter for provision of the management target information 24 (step 192).

Next, after the presenter receives provision of the management target information 24, it is assumed that a participant comes to the presentation place without "Doc A to Doc C". In this case, the participant makes a request of provision of the management target information 24 indicating the document materials to the server apparatus 14 through the mobile terminal 12 possessed by the participant (steps 100 to 114). Here, the management target information 24 indicating the document materials and the GPS information 42 for specifying the position of the presentation place are stored in the memory 36 to be matched with each other. Accordingly, the server apparatus 14 transmits information (management target specifying information, title information and provision number) relating to the management target information 24 matched with the GPS information 42 for specifying the position of the presentation place to the mobile terminal 12, according to the request of the participant from the presentation place (step 182).

The participant makes a request of provision of desired management target information 24 with reference to the information relating to the management target information 24 transmitted from the server apparatus 14 to the server apparatus 14 through the mobile terminal 12 (step 126). The server apparatus 14 acquires the desired management target information 24 from the memory 36 according to the request, and transmits the acquired management target information 24 to the mobile terminal 12 of the presenter for provision of the management target information 24 (step 192).

As the server apparatus 14 provides the management target information 24 according to the request of the mobile terminal 12 in this way, the provision history about the presenter and the participant is stored in the history DB 44 (step 190). Accordingly, even though a participant A is late as shown in FIG. 10 when the presentation has already started, the provision candidate information based on the history DB 44 is provided to the participant A. Thus, compared with a case where the history DB 44 is not provided, it is possible to perform support of easily reminding the participant A of suitable management target information 24 at a current situation (management target information 24 that is most frequently provided at present). In the example shown in FIG. 10, as the participant A acquires the provision candidate information transmitted from the server apparatus 14 by the mobile terminal 12 (steps 116 and 118), the participant A recognizes that the document material of "Doc A" is the most frequently provided. Further, as the user makes a request of provision of the management target information 24 indicating the document material of "Doc A" to the server apparatus 14 through the mobile terminal 12 possessed by the user (step 126), the user receives provision of suitable management target information 24 from the server apparatus 14 (steps 128 and 130)

Further, in the present exemplary embodiment, an example in which the number of browsing times for the entire management target information 24 is provided and the information (title information) for specifying the management target information 24 is provided every number of browsing times as shown in FIG. 8 is shown, but the disclosed technique is not limited thereto, for example, information for specifying the management target information 24 having the most frequent number of browsing times may be provided.

Further, only the management target information 24 of which the previous number of browsing times is equal to or greater may be extracted from the memory 36 and may be provided to the mobile terminal 12 by the provision unit 20. In this case, the server apparatus 14 firstly provides management target specifying information or title information relating to the management target information 24 having a browsing record that is equal to or greater than the predetermined number of times to the user as provision candidate information through the mobile terminal 12, to thereby cause the user to select the management target information 24. That is, the user transmits the management target specifying information to the server apparatus 14 through the mobile terminal 12, to thereby request provision of the management target information 24 to the server apparatus 14. The server apparatus 14 transmits the management target information 24 specified by the management target specifying information transmitted from the mobile terminal 12 to the mobile terminal 12, to thereby provide the management target information 24 to the user.

Further, in the present exemplary embodiment, an example in which the server apparatus 14 transmits the management target information 24 to the mobile terminal 12 to provide the management target information 24 to the user, but the disclosed technique is not limited thereto. For example, the content indicated by the management target information 24 may be printed on a printing sheet by a printer that is an example of an external apparatus connected to the server apparatus 14, to thereby be provided to the user as a printed matter. Further, the content indicated by the management target information 24 may be displayed on a display that is an example of an external apparatus connected to the display 58 or the computer 30, to thereby provide the management target information 24 to the user. Further, the content indicated by the management target information 24 may be output as sound by a sound reproduction apparatus, to thereby provide the management target information 24 to the user.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a processor configured to act as:
        a reception unit that receives from a mobile terminal: (1) a first request to provide management target information stored in a memory of the information processing apparatus, and (2) first location information indicating a location of the mobile terminal from where the first request is transmitted;
        a controller that associates the first location information received by the reception unit with the management target information in the memory of the information processing apparatus; and
        a provision unit that provides the management target information associated with the first location information corresponding to second location information, after the reception unit receives (1) a second request to provide management target information, and (2) the second location information indicating a second location of a second mobile terminal from where the second request is transmitted.

2. The information processing apparatus according to claim 1,
    wherein the provision unit (1) identifies a provision target candidate that is management target information that has been provided to mobile terminals a predetermined number of times, and (2) provides, when the first location information corresponding to the first request is stored in the memory, the provision target candidate matched with the corresponding first location information.

3. The information processing apparatus according to claim 2,
    wherein the provision unit provides, when the first location information corresponding to the first request is stored in the memory, the management target information that has been provided to mobile terminals a largest number of times among the management target information stored in the memory of the information processing apparatus, the management target information being matched with the corresponding first location information.

4. The information processing apparatus according to claim 3,
    wherein the provision unit further provides, when vicinity information is contained in the second request indicating a vicinity around a specified location, the management target information matched with the first location that is within the vicinity of the specified location.

5. The information processing apparatus according to claim 2,
    wherein the provision unit further provides, when vicinity information is contained in the second request indicating a vicinity around a specified location, the management target information matched with the first location that is within the vicinity of the specified location.

6. The information processing apparatus according to claim 1,
    wherein the provision unit (1) identifies a provision target candidate that is management target information that has been provided to mobile terminals a predetermined number of times in a predetermined period, and (2) provides, when the first location information corresponding to the first request is stored in the memory, the provision target candidate matched with the corresponding first location information.

7. The information processing apparatus according to claim 6,
    wherein the provision unit provides, when the first location information corresponding to the first request is stored in the memory, the management target information that has been provided to mobile terminals a largest number of times among the management target information stored in the memory of the information processing apparatus, the management target information being matched with the corresponding first location information.

8. The information processing apparatus according to claim 7,
    wherein the provision unit further provides, when vicinity information is contained in the second request indicating a vicinity around a specified location, the management target information matched with the first location that is within the vicinity of the specified location.

9. The information processing apparatus according to claim 6,
    wherein the provision unit further provides, when vicinity information is contained in the second request indicating a vicinity around a specified location, the management target information matched with the first location that is within the vicinity of the specified location.

10. The information processing apparatus according to claim 1,
    wherein the provision unit provides, when the first location information corresponding to the first request is stored in the memory, the management target information that has been provided to mobile terminals a largest number of times among the management target information stored in the memory of the information processing apparatus, the management target information being matched with the corresponding first location information.

11. The information processing apparatus according to claim 10,
    wherein the provision unit further provides, when vicinity information is contained in the second request indicating a vicinity around a specified location, the management target information matched with the first location that is within the vicinity of the specified location.

12. The information processing apparatus according to claim 1,
    wherein the provision unit further provides, when vicinity information is contained in the second request indicating a vicinity around a specified location, the management target information matched with the first location that is within the vicinity of the specified location.

13. The information processing apparatus according to claim 1, wherein
the controller associates time information indicating a time at which the first request is transmitted with the management target information,
the reception unit receives time range information when the second request and the second location information is received, and
the provision unit provides the management target information if the time indicated in the time information is included in a period of time indicated in the time range information.

14. The information processing apparatus according to claim 13,
wherein the provision unit provides, when the first location information corresponding to the first request is stored in the memory, the management target information that has been provided to mobile terminals a largest number of times among the management target information stored in the memory of the information processing apparatus, the management target information being matched with the corresponding first location information.

15. The information processing apparatus according to claim 14,
wherein the provision unit further provides, when vicinity information is contained in the second request indicating a vicinity around a specified location, the management target information matched with the first location that is within the vicinity of the specified location.

16. The information processing apparatus according to claim 13,
wherein the provision unit further provides, when vicinity information is contained in the second request indicating a vicinity around a specified location, the management target information matched with the first location that is within the vicinity of the specified location.

17. An information processing system comprising:
a mobile terminal that transmits, in a first location where provision of management target information stored in a memory is requested, first location information for specifying the first location; and
an information processing apparatus including:
a reception unit that receives the from a mobile terminal: (1) a first request to provide management target information stored in a memory of the information processing apparatus, and (2) first location information indicating a location of the mobile terminal from where the first request is transmitted;
a controller that associates the first location information received by the reception unit with the management target information in the memory of the information processing apparatus; and
a provision unit that provides the management target information associated with the first location information corresponding to second location information, after the reception unit receives (1) a second request to provide management target information, and (2) the second location information indicating a second location of a second mobile terminal from where the second request is transmitted.

18. A non-transitory computer readable medium that stores a program that causes a computer that controls an information processing apparatus comprising:
a reception unit that receives from a mobile terminal: (1) a first request to provide management target information stored in a memory of the information processing apparatus, and (2) first location information indicating a location of the mobile terminal from where the first request is transmitted; and
a controller that associates the first location information received by the reception unit with the management target information in the memory of the information processing apparatus; and
a provision unit that provides the management target information associated with the first location information corresponding to second location information, after the reception unit receives (1) a second request to provide management target information, and (2) the second location information indicating a second location of a second mobile terminal from where the second request is transmitted.

19. An information processing apparatus comprising:
a processor configured to act as:
a reception unit that receives from a mobile terminal: (1) a first request to provide management target information stored in a memory of the information processing apparatus, and (2) first information indicating a location of the mobile terminal from where the first request is transmitted;
a controller that associates the first location received by the reception unit with the management target information in the memory of the information processing apparatus; and
a provision unit that provides the management target information associated with the first information corresponding to second location information, after the reception unit receives (1) a second request to provide management target information, and (2) the second location information which indicates a location identified by the user.

* * * * *